United States Patent [19]
Imedio

[11] Patent Number: 4,743,898
[45] Date of Patent: May 10, 1988

[54] PROGRAMMABLE ELECTRONIC LOCK

[75] Inventor: Juan A. Imedio, San Sebastian, Spain

[73] Assignee: Talleres de Escoriaza, S.A., Spain

[21] Appl. No.: 42,561

[22] Filed: Apr. 23, 1987

Related U.S. Application Data

[63] Continuation of Ser. No. 698,112, Feb. 4, 1985, abandoned.

[30] Foreign Application Priority Data

Feb. 7, 1984 [FR] France ................................ 84 01855

[51] Int. Cl.[4] ........................... G06F 7/04; G06K 7/01

[52] U.S. Cl. ........................... 340/825.31; 340/825.34; 235/382; 235/382.5

[58] Field of Search ...................... 235/380, 382, 382.5; 340/825.31, 825.3, 825.32, 825.33, 825.34

[56] References Cited

U.S. PATENT DOCUMENTS

| | | | |
|---|---|---|---|
| Re. 29,259 | 6/1977 | Sabsay | 340/825.31 |
| 3,996,450 | 12/1976 | Kerkhoff | 235/382.5 |
| 4,198,619 | 4/1980 | Atalla | 340/825.34 |
| 4,207,555 | 6/1980 | Trombly | 235/382.5 |
| 4,453,074 | 6/1984 | Weinstein | 235/382 |

FOREIGN PATENT DOCUMENTS 0077101 4/1983 European Pat. Off. .

OTHER PUBLICATIONS

Search Report, FR 84 01 855.

*Primary Examiner*—Robert L. Griffin
*Assistant Examiner*—Ralph E. Smith
*Attorney, Agent, or Firm*—Ladas & Parry

[57] ABSTRACT

The present invention relates to a programmable electronic lock each constituted by an independent unit. It comprises a support of a card code and of a shift code which, after having been read, are temporarily stored in registers (5, 6) and transmitted to a computing means which also receives a system code of a register (9) of the lock, said computing means using the system code and the shift code of the register (6) as elements for conversion of the card code into key code which is stored in a register (16) supplying a comparator which also receives a lock code stored in a register (11) of the lock. The invention is more particularly applicable to the control of door locks.

8 Claims, 3 Drawing Sheets

PROGRAMMABLE ELECTRONIC LOCK

This is a continuation of co-pending application Ser. No. 698,112 filed on Feb 4, 1985, now abandoned.

The present invention relates to a programmable electronic lock.

Electronic locks operating with punched cards or other equivalent coded means are known. These locks are currently used in hotels or like premises with a large number of locks of which the cards controlling the opening must be replaced very often, as the successive occupants of a room must have different cards.

However, the locks of known type employ complicated and expensive means and do not always offer high security against burglars.

According to the present invention, the lock comprises a support of a card code and of a shift code which, after having been read, are temporarily stored in registers and transmitted to a computing means which also receives a system code of a register of the lock, said computing means using the system code and the shift code of the register as elements for conversion of the card code into key code which is stored in a register supplying a comparator which also receives a lock code stored in a register of the lock, said comparator in response to a correspondence between the lock code of the register produces at its output a signal which, through an OR gate, actuates electro-mechanical means for opening the lock, when the key code is identical to the lock code increased by one unit, the other ouput of the comparator is actuated and delivers through the OR gate a signal actuating an electro-mechanical means for opening the lock and at the output of the comparator the signal actuates a control gate which updates the lock code of the register as a function of the value of the key code in the register.

The device according to the invention does not require that the locks be connected to a central computer indicating its card code to them at any instant. Nor is it necessary to change the code when a new occupant of the room arrives. The change of code is effected automatically. In fact, when a new occupant arrives, he receives a new card which presents a certain ratio with the card of the last occupant of the same room. The first time that the new occupant introduces his card into the lock to open the door, the circuit of the lock recognizes the new code as valid and eliminates the previous code corresponding to the last occupant. This automatic change process may be repeated indefinitely. The hotel may keep a collection of cards, duly coded and stored, for each room of the hotel.

According to another solution, a computer is used which keeps in its memory the code of the present card of each room and it controls a punching means allowing the creation of new cards when new clients arrive.

The invention will be more readily understood on reading the following description with reference to the accompanying drawings, in which.

Figure 1:
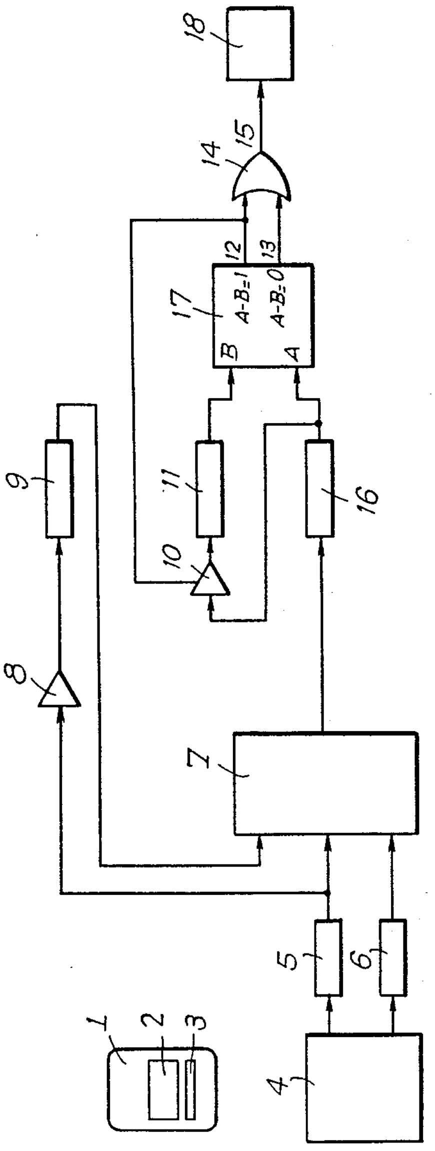
FIG. 1 is a block diagram of an electronic combination lock according to the invention.

Referring now to the drawings, FIG. 1 shows a card 1 of which the part reserved for the data is divided into two zones 2, 3. These two zones 2 and 3 are schematically shown as rectangles, but the distribution of the two zones may be otherwise.

Zone 2 contains a card code and zone 3 a shift code.

Card 1 is adapted to be engaged in a reader 4 which reads the card code of zone 2 and the shift code of zone 3.

The reader 4 is connected at its output by two registers 5, 6 to a computing means 7 itself connected at its input to a register 9 of which the input is connected by a gate 8 to the output of the register 5.

The output of the computing means 7 is connected to a register 16 of which the output is connected at A to a comparator 17 and via a gate 10 to a register 11 of which the output is connected to the input B of the comparator 17.

The outputs 12 and 13 of the comparator 17 are connected to a logic OR gate 14 of which the output 15 is connected to electromechanical means 18 for controlling the opening of the lock.

Furthermore, the ouput 12 of the comparator 17 is connected to the control of the gate 10 which controls the input of the register 11.

Register 9 keeps in its memory a system code and register 11 a lock code. These registers may be shift registers or with positions of the memory which both have the same capacity.

The contents of these registers may be modified. When the lock is installed and the batteries supply the device, these registers 9, 11 are empty and it is necessary to introduce the corresponding codes therein as will be described hereinafter.

The system code of the register 9 is identical for all the locks of a hotel. This code is modified only under exceptional circumstances and when the change is effected, it is necessary to change this code in all the locks of the hotel, at the same time.

On the contrary, the lock of register 11 is different for each of the hotel's locks. Moreover, this code is modified as a function of the succession of clients and the cards are different from one another. When card 1 is introduced into the reader 4, the latter reads the card code of zone 2 and the shift code of zone 3 and it stores them temporarily and respectively in registers 5 and 6.

The computing means 7 receives the card code of register 5, the shift code of register 6 and the system code of register 9, so that the computing means 7 uses the system code of register 9 and the shift code of register 6 as elements for conversion of the card code of register 5 into key code which is stored in register 16.

The key code of register 16 and the lock code of register 11 are introduced into the comparator 17 and if they are identical, the output 13 emits a signal which, through the logic OR gate 14, actuates the electro-mechanical means 18 which actuates the lock and allows opening of the gate.

If the codes are not identical, but the key code of register 16 is identical to the lock code of register 11 increased by one unit, the output 12 of the comparator 17 emits a signal which, through gate 14, actuates the electro-mechanical means 18.

Moreover, the signal at output 12 of comparator 17 actuates the control gate 10 updating the contents of register 11 as a function of the new value of the key code recorded in the register 16.

Consequently, the key codes of register 16 corresponding to the successive cards present a difference unit, thus allowing the automatic change of one code by another code.

In all the other cases of comparison, the outputs 12 and 13 do not produce any signal, the electro-magnetic means does not operate and the control gate 10 is not controlled.

The system code of register 9 is an element of security as far as the tests of deciphering of the system are concerned.

The only possibility of deciphering the lock device with automatic code change resides in studying successive cards until the process that they follow is found and in deducing from a card the codes of the cards of the successive clients.

In the lock mentioned above, the key code 16 should be known in order to be able to decipher the system, but this does not appear on the card. In order to obtain the key code 16 from the card code 2, it is necessary to know the system code 9, but this is a secret code which, when it is introduced in the locks, does not reappear on any card.

Furthermore, if, in the highly improbable case of someone in a hotel managing to decipher the system, if the minimum security measures necessary had not been taken, the other hotels using the same type of lock would not be affected as they have different system codes and the system code of a hotel can easily be changed.

The card code 2, the key code of register 16, the system code of register 9 and the lock code of register 11 all present the same length in number of bits. The shift code 3 is shorter than the card code 2 as its absolute value is less than or equal to the number of bits of the card code, i.e., if N is the number of bits of the shift code 3 and M the number of bits of the card code 2, $2^N \geqq M$.

In order to increase the differences between two successive cards, a variable shift is applied to the bits of the key code of register 16 before effecting the conversion mentioned above.

In order that the lock may reconstitute this key code and store it in register 16, it is necessary that it receives data concerning the number of positions corresponding to the shift code 3 figuring on the card.

When the lock is installed and the batteries are connected, the electronic circuits of the lock begin to function but the register 9 of the system code and the lock code register 11 are empty.

To introduce the codes in the registers 9 and 11, a card coded only in the zone 2 corresponding to the system code must firstly be used. In that case, the first card which is read by the reader 4 actuates the control gate 8, in this way transferring directly to the register 9 the system code coded in zone 2 of the card 1 and stored by the reader 4 in the register 5.

The second card is already a standard card corresponding to the first client. In that case, the normal process of reading and of conversion of the card code 5 into key code 16 is used, but instead of making comparisons, as indicated hereinabove, as it is the second card engaged in the reader 4, the control gate 10 is used which introduces the contents of register 16 into register 11 of the lock code. Consequently, the comparator 17 receiving the same codes, it sends a signal actuating the electro-mechanical means 18 which opens the lock and the door.

Starting of the lock is terminated and from that moment, all the cards which are introduced into the reader cause the lock to function, as described hereinabove.

Figure 2:
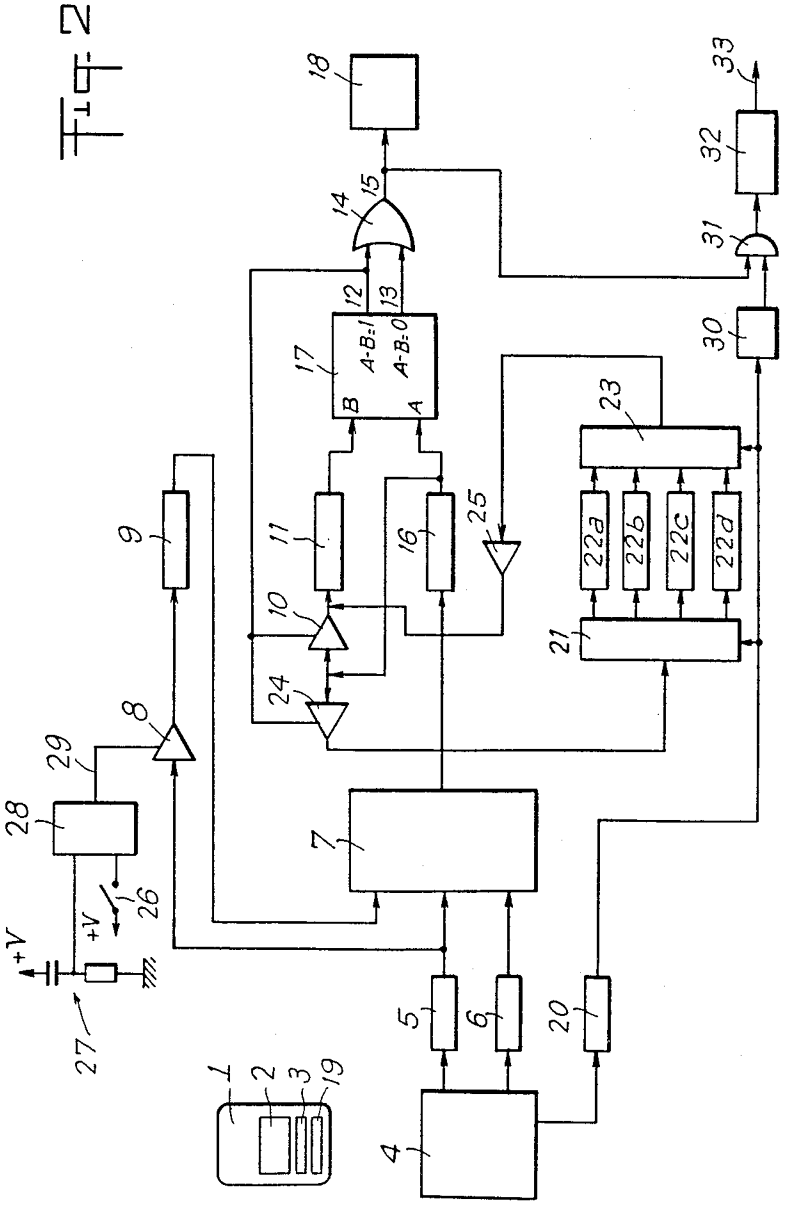
FIG. 2 is a block diagram of another embodiment of an electronic combination lock using clients' cards but also multi-level enabling cards.

FIG. 2 shows a diagram of a lock in which the basic elements of the diagram of FIG. 1 are found, but with improvements. In fact, it is necessary in a hotel to use locks which may be opened not only by the client's card, but also by multi-level enabling cards for the hotel employees.

The locks therefore form groups of which each opens with the same enabling card. These groups are different for each level of enabling card.

To this end, the card 1 shown in FIG. 2 comprises three data zones, zones 2 and 3 being identical to those defined hereinabove and the third zone 19 containing the type code indicating whether it is a client's card or the enabling level to which it belongs.

Furthermore, at the output of the reader 4, there is provided another register 20 memorizing the type code 19 which is connected by multiplexers 21, 23 to registers 22*a*, 22*b*, 22*c*, 22*d* corresponding to each type code 1 and in which the lock code is stored.

The multiplexer 21 is connected to the output of a gate 24 connected to gate 10 and which is controlled, like the latter, by the output 12 of the comparator 17.

Furthermore, the multiplexer 23 is connected by a gate 25 to the input of register 11.

Register 11 normally remains empty but means exist for filling it with lock codes stored in registers 22*a*–22*d* depending on the type code engaged in the reader of the lock.

In this way, each of the registers 22*a*–22*d* operates in the same manner as register 11 of FIG. 1.

According to the device of FIG. 2, when a card 1 is introduced into reader 4, the latter reads, in addition to the card code 5 and the shift code 6, the type code 19 which is temporarily memorized in register 20. The contents of this register through the multiplexer 21 and 23 select one of the registers 22*a*–22*d* depending on the type code. The gate 25 is then actuated and the contents of the selected register 22*a*–22*d* are transferred to register 11 of the lock code. The program of operation then continues in the same manner as described for FIG. 1.

However, when a signal is produced at the output 12 of the comparator 17, not only the control gate 10 is controlled but also the control gate 24, in order that, through multiplexer 21, the contents of register 22*a*–22*d*, corresponding to the type code, is updated. The lock functions with each type code, as with the clients' cards of FIG. 1 and, moreover, it acts independently.

For example, when an enabling card is changed, there is no repercussion with other levels of enabling cards with the client's card.

FIG. 2 also shows a device for starting up the lock which comprises a bistable flip flop 28 of which one of the inputs is connected to the differentiator RC circuit 27, and of which the other input is connected to the positive pole of the circuit via a switch 26 controlled by a button. The output 29 of the bistable flip flop is connected to the means for controlling the gate 8.

When the lock is installed, as well as the batteries, it is necessary to actuate the switch 26 located inside the lock, before introducing the card containing the system code.

When the batteries are connected, the bistable flip flop circuit 28 is excited by the circuit 27. The output of the bistable flip flop 28 by line 29 prevents operation of the control gate 8 and the system code not being able to be introduced, the lock is blocked.

When the switch 26 is closed, the bistable flip flop 28 is de-energized and the control gate 8 allows introduction of the system code into register 9.

This improvement is a safety measure against certain methods for forcing the lock.

The absolute necessity of actuating the switch 26 inaccessibly located inside the door prevents any unlawful manoeuvre.

To change the codes stored in registers *22a–22d* to determined values without having to use the automatic code change process, the type code 19 contained in register 20 is transferred to a discriminator 30 which detects whether the type code introduced into reader 4 is bigger than a preset valve. If so, it produces a signal energizing the AND gate 31. Moreover, if card 1 is valid, the output 15 of the gate 14 energizes gate 31, triggering off the time switch 32 of which the output 33 remains energized for several seconds.

If, before this period has lapsed, any card is introduced, said card is read, its key code is computed and stored in 16.

However, the comparator does not operate but its new contents are directed towards the corresponding register *22a–22d*, via the control gates 10 and 24 and the multiplexer 21.

In this way, if a valid card of the type specified by the discriminator 30 and any card of any type are successively introduced, the second card will become the valid card of its type, annulling the one which was valid until then.

However, the locks comprising an automatic code change present a drawback in that the succession and updating of the codes are interrupted if one of the clients never uses his card, this resulting in the following client not being able to open the door as the lock would be in position awaiting the previous card.

An improvement in this lock resides in that the output 12 of the comparator 17 is energized when the difference between the key code 16 and the lock code 11 is equal to one or two units.

In this way, the lock may be updated with the card of the first or the second client after the present client. This does not apply to the enabling cards.

Figure 3:
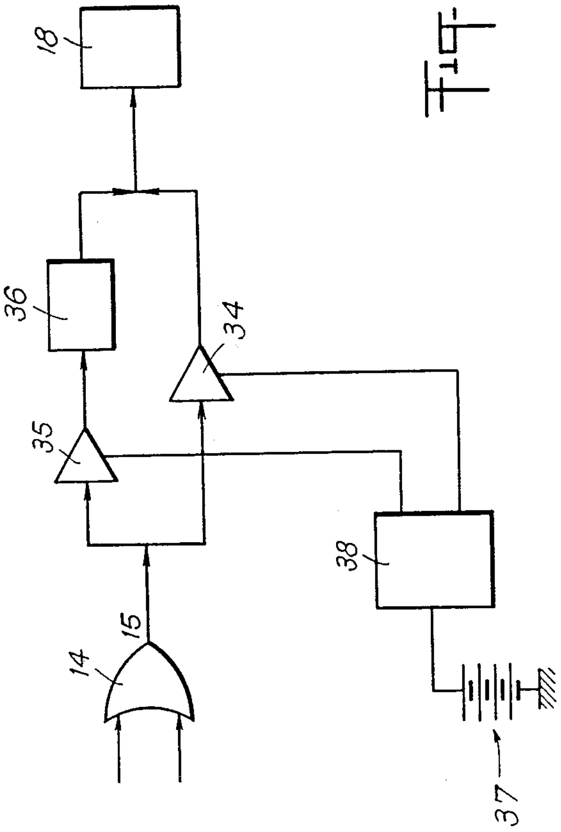
FIG. 3 is a block diagram of a detector detecting the voltage level of the batteries supplying the lock with electric current.

FIG. 3 shows a circuit informing the user that the batteries must be replaced before they have totally worn out.

On the conductor disposed between the output 15 of the gate 14 and the input of the electro-mechanical means 18, there is connected a two-way indicator device. On one of the branches of the circuit there is disposed a control gate 34 and on the other branch a control gate 35 and a time switch 36 which introduces a certain delay.

A detector 38 detecting the state of the batteries is connected to the batteries 37 supplying the rest of the circuit and it controls operation of the gates 34, 35 to which it is connected.

If the batteries 37 are in a good state, operation of the electro-mechanical means 18 will be immediate when the card is completely introduced into reader 4.

On the other hand, if the batteries have worn out, the control signal will be delayed to a certain extent by the time switch 36. In that case, when the card is introduced in the reader 4, it must be held in full engagement in the reader 4 for a few seconds to actuate the electro-mechanical means 18.

This battery charge detector operates only with the enabling cards.

The invention is, of course, non-limiting and the man skilled in the art may make modifications thereto without departing from its scope.

What is claimed is:

1. A programmable electronic lock system, comprising:

- a support (1) having a card code and a shift code;
- a card code register (5);
- a shift code register (6);
- reader means (4) for reading the codes of the support and temporarily storing them respectively in the card and shift code registers (5,6);
- a system code register (9) having a system code;
- computing means (7) receiving the card, shift and system codes from the registers (5, 6, 9) thereof and using the system and shift codes for converting the card code into a key code;
- a key code register (16) for temporarily storing the key code;
- a lock code (11) having a lock code;
- a control gate (10) for, when actuated, updating the lock code of the lock code register (11) as a function of the value of the key code then stored in the key code register (16);
- a comparator (17) receiving the key and lock codes from the registers (16, 11) thereof and having first and second outputs (12, 13) for producing a signal at the first output (12) in response to identity of the key code to the lock code increased by one unit, the signal at the first output (12) actuating the control gate (10), and producing a signal at the second output (13) in response to identity between the key and lock codes;
- an OR gate (14) connected to the first and second outputs (12, 13) of the comparator (17) and having an output (15), the OR gate (14) producing a signal on the OR gate output in response to the signal at the first or second output (12, 13) of the comparator (17); and
- electro-mechanical locks means (18) responsive to the signal at the output (15) of the OR gate (14) for opening.

2. The electronic lock system of claim 1, wherein the support (1) comprises a card having two zones respectively containing the card and shift codes.

3. The electronic lock system of claim 1, wherein the shift code has a number N of bits, the card code has a number M of bits, and $2^N \geqq m$.

4. The electronic lock system of claim 1, wherein the support (1) further has one of a certain number of type codes and the reader means (4) further comprises means for reading the one type code, and further comprising:

- a type code register (20) for temporally storing the one type code read by the reading means;
- multiplexer means (21, 23) connected to the type code register (20);
- a number of registers *(22a, 22b, 22c, 22d)* corresponding to the certain number of type codes with respective, further lock codes, the type code temporarily stored in the type code register (20) activating, through multiplexer means (21, 23), the one of the number of registers *(22a, 22b, 22c, 22d)* corresponding to the temporarily-stored type code; and
- a second control gate (25) for transferring the further lock code of the activated one of the number of registers into the lock code register (11) as the lock code thereof.

5. The electronic lock system of claim 4, and further comprising:

a third control gate (24) responsive to the signal at the first output (12) of the comparator (17) for updating the further lock code of the one of the number of registers corresponding to the temporarily-stored type code.

6. the electronic lock system of claim 4, and further comprising:

a discriminator (30) receiving the type code from the code register (20) and having an output for providing a signal when the type code is bigger than a value preset therein;

an AND gate (31) having two inputs, one input of the AND gate being connected to the output of the discriminator (30) and the second input being connected to the output (15) of the OR gate (14), and an output for producing a triggering signal in response to signals at the inputs of the AND gate from the discriminator (30) and the OR gate (14); and a time switch (32) responsive to the triggering signal of the output of the AND gate (31).

7. The electronic lock system of claim 1, and further comprising:

a power supply;

a bistable flip flop (28) having first and second inputs and an output (29);

a switch (26) switchingly connecting one of the first and second inputs of the bistable flip flop (28) of the power supply;

a differentiator RC circuit sensitive to the switching connection of the switch connected to the other of the first and second inputs of the bistable flip flop (28); and a fourth control gate (8) connected to the output (29) of the bistable flip flop (28) and operative for controlling introduction of the system code into the system code register (9).

8. The electronic lock system of claim 1, and further comprising:

a second control gate (34) and a series connection of a third control gate (35) and a time switch (36) connected in parallel between the output (15) of the OR gate (14) and the electro-mechanical lock means (18);

a battery (37); and a detector (38) detecting the state of the battery (37) for controlling the second and third control gates (34, 35) for inserting a time delay between a signal at the output (15) of the OR gate (14) and the opening of electro-mechanical lock means (18) when the battery has worn out.

* * * * *